(12) United States Patent
Doroslovac

(10) Patent No.: US 11,433,512 B1
(45) Date of Patent: Sep. 6, 2022

(54) ANGLE DRIVEN ACCESS TOOL

(71) Applicant: Robert S. Doroslovac, Massillon, OH (US)

(72) Inventor: Robert S. Doroslovac, Massillon, OH (US)

(73) Assignee: BCD Unlimited, LLC, Thonotosassa, FL (US)

( * ) Notice: Subject to any disclaimer, the term of this patent is extended or adjusted under 35 U.S.C. 154(b) by 404 days.

(21) Appl. No.: 16/599,281

(22) Filed: Oct. 11, 2019

Related U.S. Application Data

(60) Provisional application No. 62/766,257, filed on Oct. 11, 2018.

(51) Int. Cl.
*B25B 23/00* (2006.01)
*F16D 3/10* (2006.01)
*F16C 3/02* (2006.01)

(52) U.S. Cl.
CPC ...... *B25B 23/0014* (2013.01); *B25B 23/0028* (2013.01); *F16C 3/02* (2013.01); *F16D 3/10* (2013.01)

(58) Field of Classification Search
CPC ... B25B 23/0014; B25B 23/0028; F16C 3/02; F16D 3/10
USPC ...................................................... 81/177.75
See application file for complete search history.

(56) References Cited

U.S. PATENT DOCUMENTS

| 1,392,220 A * | 9/1921 | Quint ................. B25B 23/0014 81/177.75 |
| 2,526,105 A * | 10/1950 | Adams ..................... F16D 3/207 464/115 |
| 5,277,088 A * | 1/1994 | Vasichek ................. B25B 23/12 81/125 |
| 5,577,426 A | 11/1996 | Eggert et al. |
| 6,092,441 A | 7/2000 | Jarvis |
| 6,347,564 B1 | 2/2002 | Ciocca |
| 7,278,342 B1 * | 10/2007 | Chang ................. B25B 23/0028 81/177.75 |
| 8,246,476 B2 * | 8/2012 | Chen ..................... B25B 13/481 464/141 |
| 8,650,992 B2 * | 2/2014 | Neitzell ................ B25B 13/481 81/177.75 |
| 2020/0061783 A1 * | 2/2020 | Chen ..................... B25B 13/481 |

* cited by examiner

*Primary Examiner* — Hadi Shakeri
(74) *Attorney, Agent, or Firm* — Harpman & Harpman

(57) ABSTRACT

An angle drive socket tool that provides interchangeable multi-angular socket for inserting a tool. A drive shaft has a driver engagement end and a magnetic enabled concave fastener receiving end with retainment and drive engagement pins. A driver component having a spherical insert end with a drive pin engagement channel extending there about an oppositely disposed drive configured input end, such as a hex socket suitable to drive a fastener of choice as illustrated in the preferred embodiment.

3 Claims, 4 Drawing Sheets

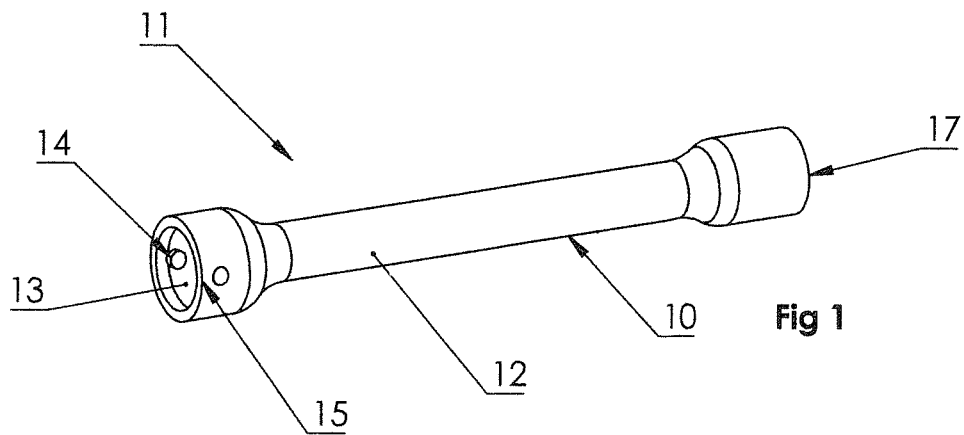
Fig 1
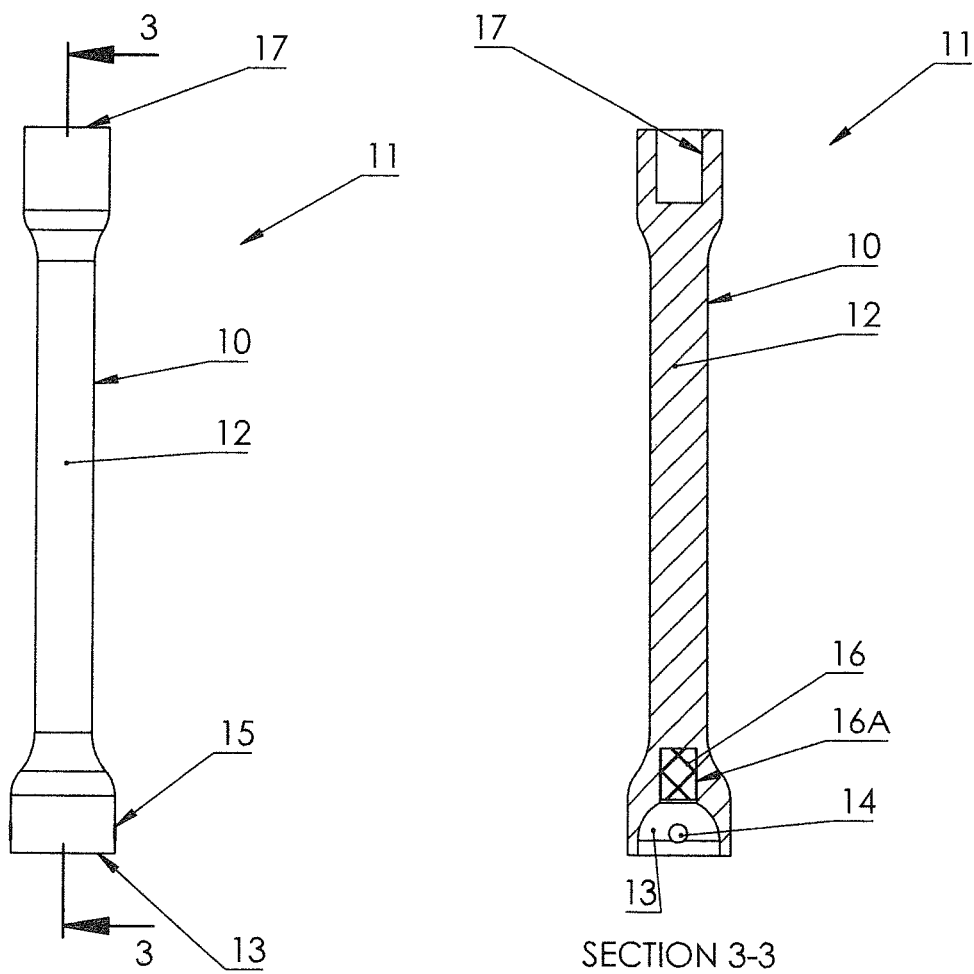
Fig 2
Fig 3

ANGLE DRIVEN ACCESS TOOL

This application claims the benefit of U.S. Provisional Application No. 62/766,257, filed Oct. 11, 2018.

BACKGROUND OF THE INVENTION

1. Technical Field

This improved tool is related to socket body tools that provide angle orientation drive socket engagement.

2. Description of Prior Art

Prior art devices of this type have been directed to the necessity of a tool to reach tight places with minimal access and often at an angle. Such prior art devices are designed for angular access required typically to have large angle adaptive mechanisms to assure both the adjustability and angle, but also the structure to impart substantial rotational torque needed in such compact spaces.

Examples of such prior art patents can be seen in U.S. Pat. Nos. 5,577,426, 6,092,441 and 6,347,564.

In U.S. Pat. No. 5,577,426 a magnetic bit holder is illustrated having a magnet with a bit related socket.

U.S. Pat. No. 6,092,441 discloses a multiple fitting adapter for use on socket wrenches. The fitting has a skirt defining a cavity with a pivot pin for registration through a round base insert aperture driver positioned and held within.

U.S. Pat. No. 6,347,564 claims a fastener driver hand tool with angular displaced bit retainer. The bit retainer has a ball joint secured with a retaining pin and is capable of holding one of a variety of bits. Rotation of a sleeve on the shank binds the bit retainer in axial alignment with the shank and counter rotation of the sleeve releases the bit retainer for angular displacement or repositioning with respect to the tool's longitudinal axis.

SUMMARY OF THE INVENTION

The present invention comprises a connecting driver shaft having one end formed as a multi-angular receiving cavity with drive pins and a magnet and the other end having a cavity suited to be driven by a driver of choice. An engagement component consists of a spherical end with a pin registering groove extending there about on its longitudinal axis. A driver input suited to drive a fastener of choice is formed in its opposite end. The engagement component is retained within the receiving cavity of the drive shaft and held in position by the magnet therein.

An intermediate driver shaft fitting is also provided having a female cavity with drive pins and a retainment magnet within while the other end has a spherical design with longitudinal axis oriented groove therein to mimic the engagement component's spherical end for retainment registration within as an extending element of the drive shaft.

DESCRIPTION OF THE DRAWINGS

FIG. 1 is a perspective view of the angle drive shaft socket tool drive receiving shaft.
FIG. 2 is a side elevational view thereof.
FIG. 3 is a cross-sectional view on lines 3-3 of FIG. 2.

DETAILED DESCRIPTION OF THE INVENTION

Figure 4:
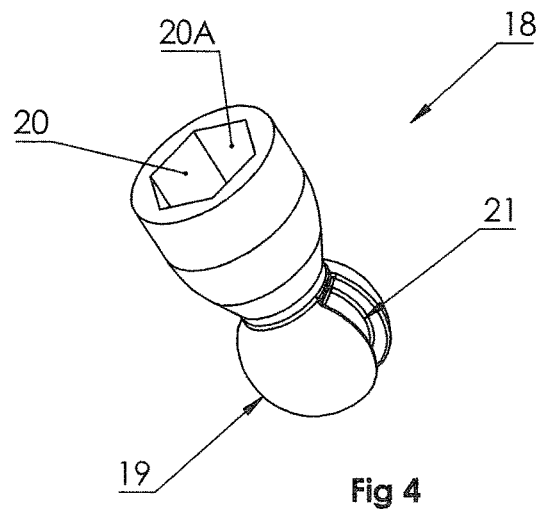
FIG. 4 is an enlarged perspective view of a shaft engagement driver component.
Figure 5:
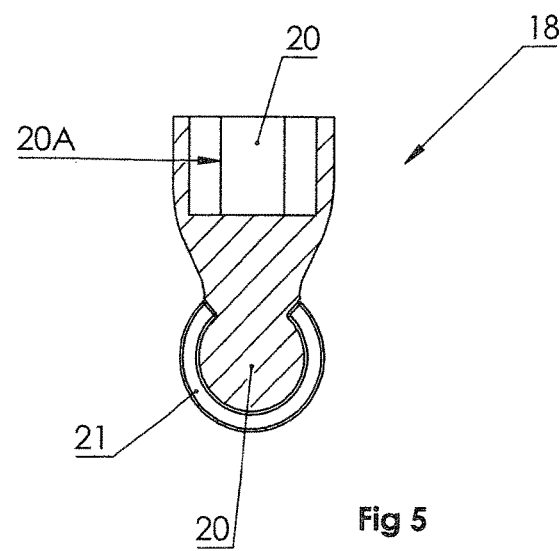
FIG. 5 is a cross-sectional view thereof.
Figure 6:
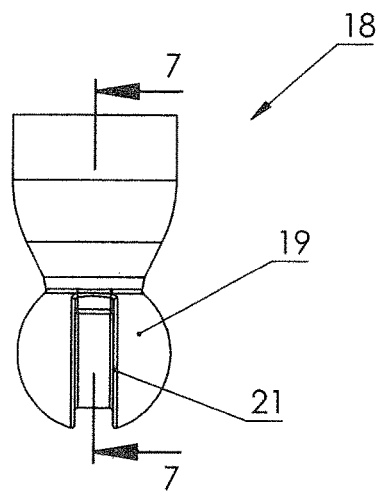
FIG. 6 is a side elevational view of the engagement component.
Figure 7:
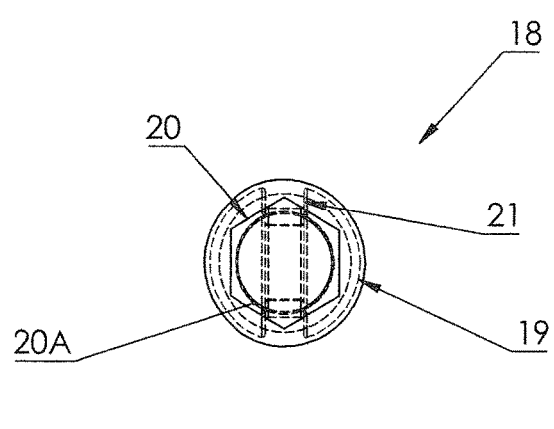
FIG. 7 is a top plan view thereof.

Referring to FIGS. 1-3 of the drawings, the connecting drive shaft 10 of the multiple angled compact socket driver 11 of the invention can be seen comprising a connective shaft 12 with a concave receiving cavity 13 in one end having a pair of oppositely disposed fastener receiving pins 14 and 15 and a centrally positioned retainer magnet 16 therein. The magnet 16 is of a powerful earth element type secured within a receiving cavity 16A.

The drive shaft's oppositely disposed end has a receiving socket 17 for connection to a drive tool of choice, not shown.

Referring now to FIGS. 4-8 of the drawings, a primary multi-angled engagement insert component 18 can be seen having a male spherical insert portion 19 and a female driver input socket 20 which in this example has a hexagonal receiving interior surface 20A. It will be apparent to those skilled in the art that a variety of different fixation socket configurations can be substituted depending on the use venue required.

The spherical insert portion 19 has a semi-annular retainment channel 21 disposed longitudinally there around for registerable engagement within the drive shaft concave receiving cavity 13. It will be evident that the oppositely disposed fastener receiving pins 13 and 14 will be in aligned drive registration with the engagement channel 21 providing opposing force vector points of angular adaptable rotational torque during use.

The pins 13 and 14 are, in this example, of a pressed fit configuration within corresponding registering bores 13A and 14A in an annular sidewall 22 of the shaft receiving cavity 13.

Figure 8:
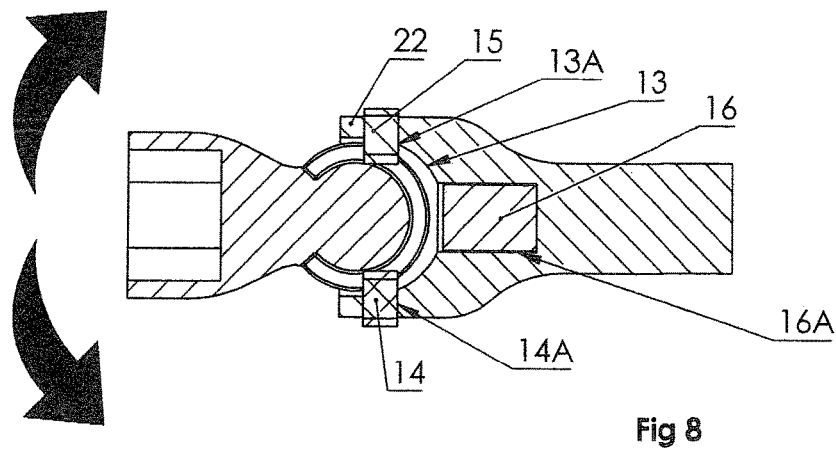
FIG. 8 is an enlarged partial cross-sectional assembly of the drive shaft receiving cavity with a tool engagement component rotatably retained there within in solid and broken lines.
Figure 9:
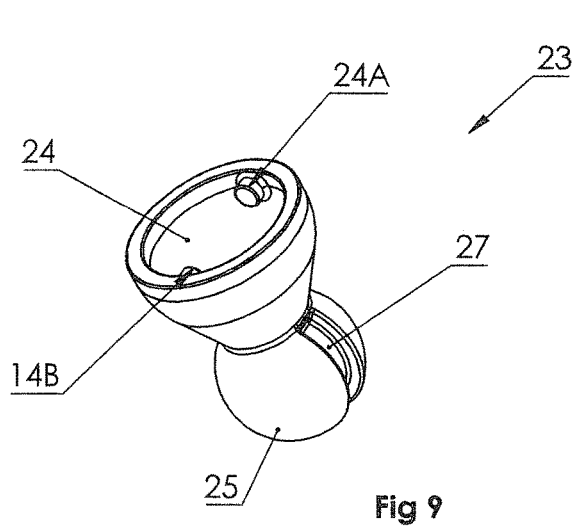
FIG. 9 is an enlarged perspective view of an intermediate drive shaft fitting.

As noted, it will be evident that the rare earth magnet 16 will magnetically attract and hold the male spherical insert portion 19 during use as best seen in FIG. 8 of the drawings.

Referring now to FIGS. 9-12 of the drawings, a so defined intermediate drive shaft fitting 23 can be seen having a female spherical receiving cavity 24 at one end and a semi-spherical male insert portion 25 in oppositely disposed relation thereto on its other end. A rare earth magnet 26 is fitted within the cavity 24 to again provide magnetic attraction and retainment of the so inserted insert 25. Secondary fastener receiving pins 24A and 24B are provided as noted in the hereinbefore described engagement insert component 18.

Figure 10:
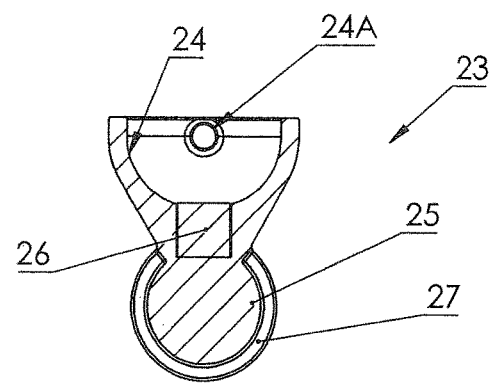
FIG. 10 is a cross-sectional view thereof.
Figure 11:
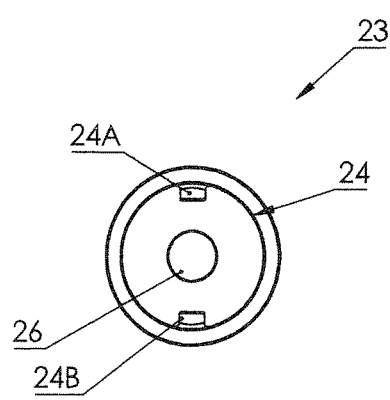
FIG. 11 is a top plan view thereof.
Figure 12:
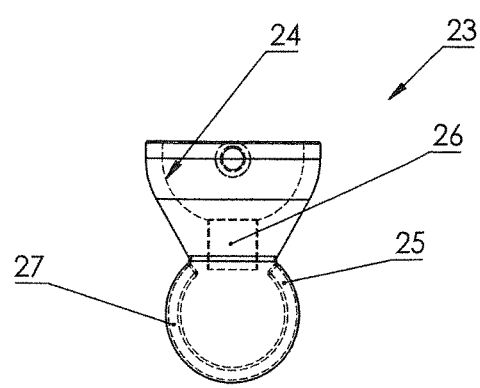
FIG. 12 is a front elevational view of the intermediate driver shaft fitting shown in solid lines and in broken lines an extended version thereof.

It will be seen that the spherical male insert 25 also has a registration channel 27 there about for engagement with the hereinbefore described drive shaft fastening receiving pins 13 and 14 when so applied. The magnet 26 fitted within the female spherical receiving cavity 24, as best seen in FIGS. 10 and 11 of the drawings, will allow angular rotation of the male insert and serve as a positional retainer thereto thus maintaining the angular inclination, so achieved, during use.

It will thus be evident from the above referred to description that the use arrangement of the multi-angle component socket driver tool 11 of the invention as follows. The drive shaft 10 receives the primary multi-angular engagement insert component 18 in the receiving cavity 13 and is held with the magnet 16. The pins 14 and 15 are aligned in registration in the channel 21 thereby providing an angular adjustable retained torque transfer to the drive tool received therein, as seen in FIG. 8 of the drawings. The intermediate drive shaft fitting 23 which provides a secondary female spherical receiving cavity 24 at one end and a semi-spherical male insert 25 in oppositely disposed relation to the other can be selectively engaged within the drive shaft 10 and may be of an increased longitudinal length as illustrated in FIG. 10 of the drawings so as to provide an intermediate extension and/or secondary engagement configuration for so configured drive fittings to be received therein. It will thus be seen that a new and novel angle driven access tool has been described and it will be apparent to those skilled in the art that various changes and modifications may be made without departing from the spirit of the invention, therefore I claim:

The invention claimed is:

1. An angle driven axis tool comprises;
   a drive connector shaft, a concaved receiving cavity in one end thereof and an oppositely disposed end socket in said drive connecting shaft in longitudinal alignment thereto for engagement of a driver, said concave receiving cavity has a retainer magnet therein and a pair of fixed oppositely disposed rotational torque transfer pins extending partially from within said concave receiving cavity,
   an intermediate driver shaft fitting for selective rotational retainment within said concave receiving cavity of said drive connecting shaft, said intermediate driver shaft fitting has a secondary concave receiving cavity in one end and a secondary male semi-spherical insert portion extend from its oppositely disposed end, a force transfer channel extending entirely around said secondary male semi-spherical insert portion for selective registration with said rotational torque transfer pins and said retaining magnet and a pair of secondary fastener receiving rotational torque transfer pins in spaced oppositely disposed relation to one another in said secondary concave receiving cavity and a secondary retainer magnet within said secondary concave receiving cavity, and
   a multi-angle engagement insert component for selective rotational retainment within said concaved receiving cavity or said secondary concave receiving cavity, said multi-angle engagement insert component having a spherical male insert with a spherical portion, a force transfer engagement channel in and extending entirely around the spherical portion of said spherical male insert aligned along its longitudinal axis for selective registration with said rotational torque transfer pins or said secondary fastener receiving rotational torque transfer pins when so engaged, accordingly, said corresponding retainer magnet and said corresponding rotational torque transfer pins stabilizes and retains said spherical male insert both in a longitudinal and angle turning rotational manner respectively.

2. The angle driven axis tool set forth in claim 1 wherein said force transfer channel in and extending around the spherical portion of said spherical male insert of said multi-angle engagement insert component is of a transverse dimension and depth equal to that of said respective rotational torque transfer pins.

3. The angle driven axis tool set forth in claim 1 wherein each said retainment magnets is centrally positioned within a corresponding concave receiving cavities.

* * * * *